(12) United States Patent
Chen et al.

(10) Patent No.: US 12,725,321 B2
(45) Date of Patent: Sep. 1, 2026

(54) CONTROL FONT GENERATION CONSISTENCY

(71) Applicant: Microsoft Technology Licensing, LLC, Redmond, WA (US)

(72) Inventors: Li Chen, Redmond, WA (US); Ji Li, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 275 days.

(21) Appl. No.: 18/457,521

(22) Filed: Aug. 29, 2023

(65) Prior Publication Data

US 2025/0078343 A1 Mar. 6, 2025

(51) Int. Cl.

*G06T 11/10* (2026.01)
*G06F 40/40* (2020.01)
*G06T 5/70* (2024.01)
*G06T 7/50* (2017.01)

(52) U.S. Cl.

CPC .............. *G06T 11/10* (2026.01); *G06F 40/40* (2020.01); *G06T 5/70* (2024.01); *G06T 7/50* (2017.01); *G06T 2200/24* (2013.01)

(58) Field of Classification Search

None

See application file for complete search history.

(56) References Cited

U.S. PATENT DOCUMENTS

2024/0127510 A1* 4/2024 Darabi .................... G06T 11/60
2024/0355018 A1* 10/2024 Aggarwal ................ G06T 7/50

* cited by examiner

*Primary Examiner* — Jeffrey J Chow
(74) *Attorney, Agent, or Firm* — NovoTechIP International PLLC

(57) ABSTRACT

Systems and methods for generating custom art fonts with consistent style include receiving user input that identifies a base font style for a custom font and includes descriptive text that defies one or more text effects to use for the custom font. Depth maps are selected for characters to be included in the custom font. The depth maps are preprocessed to add noise to the depth maps. A generative model generates custom font images conditioned with the text prompt and the depth maps. The custom font images are then used to render text on a display screen of a computing device.

20 Claims, 10 Drawing Sheets

500
508
Image
512
DESIGN
Your Text
506
DESIGN
Font Selection
D
502
504
Describe how you want it to look
Shiny gold balloon
SUBMIT
510

CONTROL FONT GENERATION CONSISTENCY

BACKGROUND

An “art font” typically refers to a typeface or font that has been designed with one or more artistic, decorative, and unique effects (collectively referred to herein as “text effects”) to create visually unique and visually engaging text. A text effect refers to any visual alteration or manipulation applied to text in order to enhance its appearance, create a specific style, or convey a particular artistic or design intention. Text effects can range from simple adjustments to intricate transformations, and they can be applied to various attributes of the text, such as font style, color, size, spacing, and positioning. Some common types of text effects include shadow and depth effects, gradient and color effects, embossing and debossing, 3D effects, distortion and warping, texture and pattern overlay, metallic or reflective effects, liquid or fluid effects, animated effects, etc.

Recent advances in artificial intelligence (AI) have enabled AI to be used to automate and expediate the art font design process, thus making it easier and less time consuming to create unique and customized art fronts. While the use of AI has simplified and sped up the custom art font design and creation process, maintaining style consistency across the letters of a custom art font has remained a challenge. To improve the style consistency for a custom font, previously known systems generate a first image of a custom font, extract the style from the image, and inject the style to other characters of the custom font. While this method can improve style consistency, the extra style generation, style extraction, and style injection significantly increases the computational requirements required for custom font generation.

Finding ways to improve the ability of generative models to generate custom art fonts with consistent style and require fewer computing resources relative to previously known methods are thus needed.

SUMMARY

In one general aspect, the instant disclosure presents a font generation system having a processor and a memory in communication with the processor wherein the memory stores executable instructions that, when executed by the processor alone or in combination with other processors, cause the font generation system to perform multiple functions. The function include receiving user input that identifies a base font style for a custom font and includes descriptive text that describes in a natural language format one or more text effects to use for the custom font; selecting depth maps for characters to be included in the custom font, each depth map including an image of one of the characters for the custom font; preprocessing the depth maps for the custom font using a predetermined function that adds noise to at least a character portion of each of the depth maps; and providing the descriptive text and the preprocessed depth maps to a generative image model, the descriptive text being provided to the generative image model as a text prompt, the generative image model being trained to generate a custom font output image for each character to be included in the custom font conditioned by the text prompt and the preprocessed depth map associated with the character; and receiving the custom font output images for each character included in the custom font from the generative image model and utilizing the custom font output images to render text on a display screen of a computing device.

In yet another general aspect, the instant disclosure presents a method for generating custom art fonts using a generative image model. The method includes receiving user input that identifies a base font style for a custom font and includes descriptive text that describes in a natural language format one or more text effects to use for the custom font; selecting depth maps for characters to be included in the custom font, each depth map including an image of one of the characters for the custom font; preprocessing the depth maps for the custom font using a predetermined function that adds noise to at least a character portion of each of the depth maps; and providing the descriptive text and the preprocessed depth maps to the generative image model, the descriptive text being provided to the generative image model as a text prompt, the generative image model being trained to generate a custom font output image for each character to be included in the custom font conditioned by the text prompt and the preprocessed depth map associated with the character; and receiving the custom font output images for each character included in the custom font from the generative image model and utilizing the custom font output images to render text on a display screen of a computing device.

In a further general aspect, the instant application describes a non-transitory computer readable medium on which are stored instructions that when executed cause a programmable device to perform functions of receiving user input that identifies a base font style for a custom font and includes descriptive text that describes in a natural language format one or more text effects to use for the custom font; selecting depth maps for characters to be included in the custom font, each depth map including an image of one of the characters for the custom font; preprocessing the depth maps for the custom font using a predetermined function that adds noise to at least a character portion of each of the depth maps; and providing the descriptive text and the preprocessed depth maps to a generative image model, the descriptive text being provided to the generative image model as a text prompt, the generative image model being trained to generate a custom font output image for each character to be included in the custom font conditioned by the text prompt and the preprocessed depth map associated with the character; and receiving the custom font output images for each character included in the custom font from the generative image model and utilizing the custom font output images to render text on a display screen of a computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Art fonts with text effects are commonly used in graphic design, typography, digital art, and other creative fields to make text more visually engaging, unique, and expressive. Art font creation has typically required the use of specialized software, such as a computer-aided design (CAD) application, a dedicated font design/editing application, and other type of drawing/image generating program, application, and tool. These applications, however, typically have a steep learning curve which has limited their widespread adoption and use. In addition, generating art fonts with such applications can be a time-consuming process even for highly skilled users.

Recent advances in artificial intelligence (AI) have enabled AI to be used to automate and expediate the art font design process, thus making it easier and less time consuming to create unique and customized art fronts. AI font generators use machine learning algorithms and models to generate custom font images based on natural language descriptions and instructions (referred to herein as a "text prompt") supplied by a user. AI font generators typically utilize generative models for image generating tasks during font creation. Generative models refer to machine learning models capable of generating new data similar to the data on which they were trained. Examples of generative models include generative adversarial networks (GANs), variational auto encoders (VAEs), transformer-based large language models (LLMs), and diffusion models.

Figure 1:
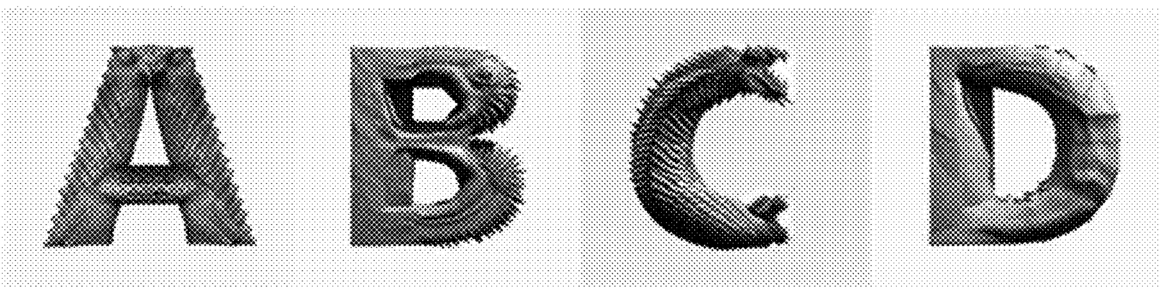
FIG. 1 shows a plurality of custom art font images generated using a prior art font generation process resulting in inconsistent style across the images.

While generative models have simplified and sped up the art font design and creation process, one difficulty associated with the use of generative models for custom font generation is generating custom fonts with style consistency across multiple characters in the same generation session. FIG. 1 shows an example of multiple character images (i.e., "A,", "B", "C", and "D") which were generated in the same session by a generative model using a dragon-themed, custom, dragon-themed font. The generative model generated each of the character images based on the same base font style and the same text prompt such that each character image has a dragon-like appearance. However, due to the manner in which each character image was generated by the generative model, the dragon imagery has been applied to each character in slightly different ways resulting in an inconsistent font style across letters in the same custom font. An inconsistent font style across characters in a font, at the very least, could distract viewers from the underlying message the characters are trying to convey, and could potentially deter users from viewing imagery and content associated with the inconsistent font style.

Figure 2:
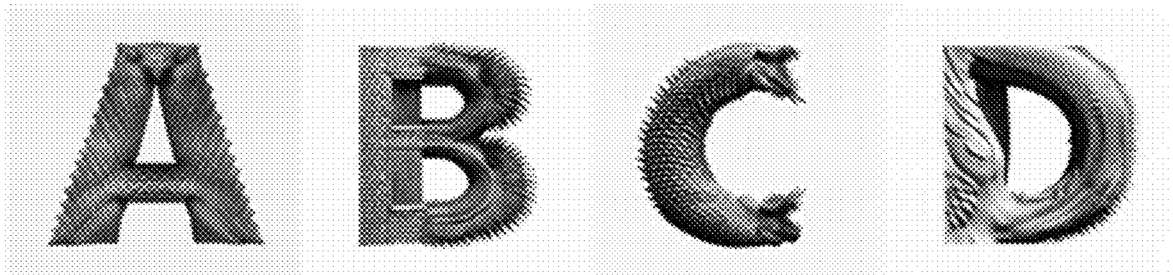
FIG. 2 shows a plurality of custom art font images generated from the custom art font images of FIG. 1 using a prior art process to improve style consistency involving style extraction from one image and injection into other images.

Previously known font generation systems have attempted to address the issue of generating custom art fonts with consistent style across multiple font characters by extracting the style from an image of the first character, and then injecting the style into images of the other characters in the custom font. FIG. 2 shows the result of using such a process on the font images shown in FIG. 1. While this method can improve the style consistency of custom fonts across multiple characters of the font, the extra font generation, style extraction, and style injection significantly increases the computational requirements required for custom font generation. In addition, the style is locked to the first generated font and requires the use of hyperparameters to control and fine-tune the extent to which the style is ingested during image generation. For example, as shown in FIG. 2, extracting the style from the image of the letter "A" and injecting the style into the image of the letter "B" results in the "dragon eye" feature from the image of the letter "B" in FIG. 1 being diminished, obscured, or omitted altogether in the image of the letter "B" in FIG. 2. Therefore, while this method may improve style consistency, the method can result in changes to generated images which adversely affect the underlying style of the images.

To address these technical problems and more, in an example, this description provides technical solutions in the form of font generation systems and methods that enable custom art fonts to be generated with consistent style. The systems and methods leverage a text-guided depth-to-image model (which is a generative model, e.g., latent diffusion model, Stable Diffusion model) to generate custom font images based on a text prompt and a font depth map. The text prompt defines the visual characteristics, text effects, instructions and the like for guiding the image generating process. The font depth map is a grayscale image of an alphanumeric character that encodes depth information for pixels of the image as different shades of gray. Because there is little to no depth variation in a font image, a font depth map is essentially a white image of an alphanumeric character against a black background. Depth maps provide an easily detectable boundary for guiding image generation inside and at the boundary of a character.

To improve the style consistency of custom fonts, preprocessing of each depth map is performed to add noise to the depth map. The noise may be added by processing each depth image using one or more noise filters or functions (e.g., Gaussian, Perlin, point, and the like) which results in a relatively uniform noise being added to the depth map. The added noise forms artifacts in the depth maps which in turn provide starting points for image generation and feature size during denoising steps (explained in more detail below).

Because each depth map used in a custom font generation session will have the same preprocessing operation/effect applied thereto, generating custom font images for different characters from the same text prompt would have the same artifacts and feature sizes to guide denoising steps so that denoising is more consistent across characters, which in turn results in more consistency in the visual characteristics of the final output images.

Prompt engineering may be used to further improve font consistency and overall font generation performance for the system. Prompt engineering, in the context of natural language processing and machine learning, refers to the process of designing and formulating prompts that are used to interact with or instruct models. The goal of prompt engineering is to craft input text that guides the model to generate desired outputs or responses. In the context of the instant disclosure, prompt engineering includes generating font descriptions and instructions with consistent phrasing, formatting, and the like that increases the likelihood of achieving a desired visual style for a custom font and style consistency across characters in the custom font.

The technical solutions described herein address the technical problem of inefficiencies and difficulties associated with custom art font generation using generative AI models. The technical solutions enable custom fonts with consistent style to be generated using fewer computing resources relative to previously known systems and methods. The technical solutions also offer end-users increased flexibility and more control of the art font design process which could potentially create more engagement for the user. The techniques described herein are compatible with any backbone image generating model, such as ControlNet or DALL-E models, or other fine-tuned Stable Diffusion models and can also work with other fine-tuning techniques for improving font generation performance, such as prompt engineering, Low-Rank Adaptation (LoRa) of Large Language Models (LLMs), hypernetworks, style embedding, and the like.

Figure 3:
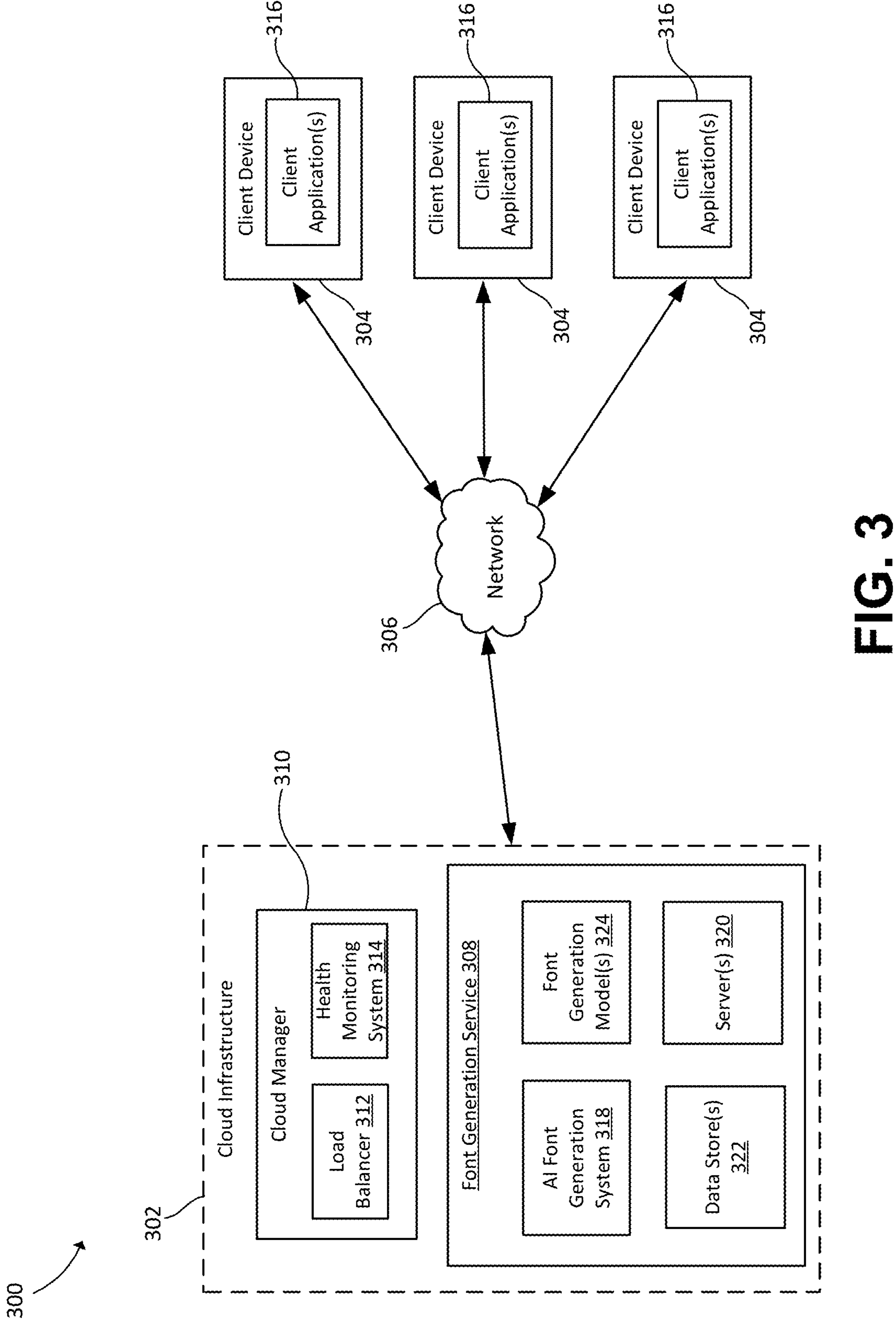
FIG. 3 is a diagram showing an example computing environment in which the techniques disclosed herein may be implemented.

FIG. 3 is a diagram showing an example computing environment 300 in which aspects of the disclosure may be implemented. Computing environment 300 includes cloud infrastructure 302, client devices 304, and a network 306. The network 306 includes one or more wired and/or wireless networks. In embodiments, the network 306 includes one or more local area networks (LAN), wide area networks (WAN) (e.g., the Internet), public networks, private networks, virtual networks, mesh networks, peer-to-peer networks, and/or other interconnected data paths across which multiple devices may communicate.

The cloud infrastructure 302 is configured to provide one or more cloud computing services and/or distributed computing services, including a font generation service 308 (explained in more detail below), to users over the network 306. Cloud infrastructure 302 may provide other services, such as hosting applications, user authentication, file storage, system updates, and the like. Cloud infrastructure 302 includes one or more servers 320 which are configured to provide computational and storage resources for the font generation service 308. Servers are implemented using any suitable number and type of physical and/or virtual computing resources (e.g., standalone computing devices, blade servers, virtual machines, etc.). Cloud infrastructure 302 may also include one or more data stores 322 for storing data, programs, and the like for implementing and managing the font generation service 308. In FIG. 3, one server 320 and one data store 322 are shown although any suitable number of servers and/or data stores may be utilized.

Cloud infrastructure 302 includes a cloud manager 310 for managing various aspects of the cloud infrastructure, such as deploying, configuring, and managing physical and/or virtual machines. Cloud manager 310 includes a load balancer 312 for distributing requests and workloads among server farms and/or among servers of a server farm. The load balancer 312 utilizes parameters such as load, number of connections, and server performance, to determine where to distribute the requests and workloads. Cloud manager 310 also includes a health monitoring system 314 configured to monitor the health of physical and virtual resources. and identify faulty components so that remedial action can be taken.

Client devices 304 enable users to access the services provided by the cloud infrastructure 302 via the network 306, such as the font generation service 308. Client devices 304 can be any suitable type of computing device, such as personal computers, desktop computers, laptop computers, smart phones, tablets, gaming consoles, smart televisions and the like. Client devices 304 include one or more client (software) applications 316 that are configured to interact with the font generation service 308. A client application 316 may be a standalone application installed on the client device 304 for interacting with the font generation service 308 or may be integrated into another application (e.g., as an extension or plugin) to enable interaction with the font generation service. In some implementations, the client application may be a general-purpose application, such as a web browser, configured to access the font generation service 308 over the network 306.

Figure 4:
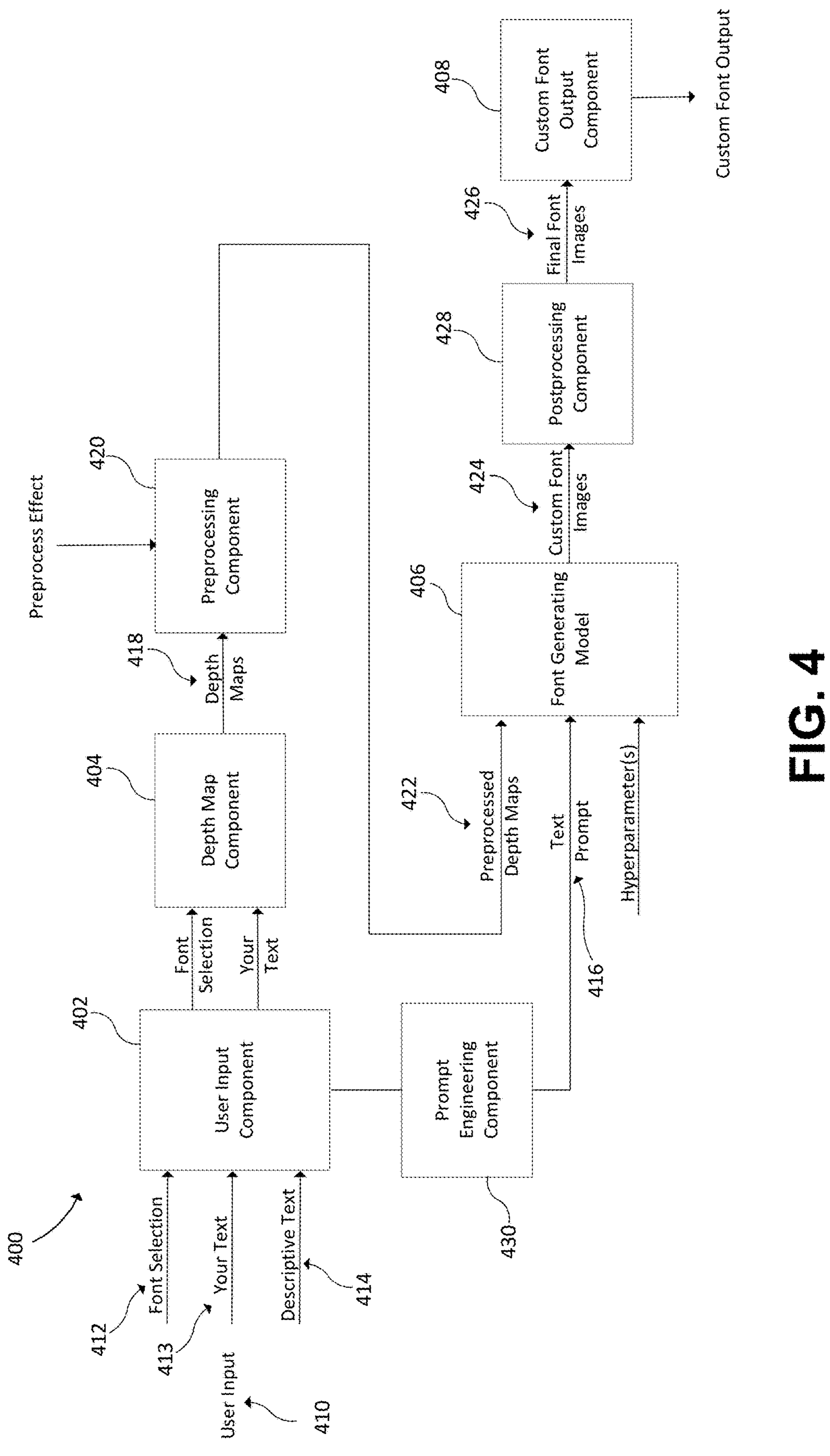
FIG. 4 shows an example implementation of a font generation system for the font generation service of the cloud environment of FIG. 3.

In accordance with the disclosure, the font generation service 308 includes a font generating system 318 that uses AI techniques to generate custom fonts based on user input. An example implementation of an AI font generating system 400 is shown in FIG. 4. The font generating system 400 includes a user input component 402, a depth map generating component 404, a font generating model 406, and a custom font output component 408.

The input component 402 is configured to receive user input 410 that enables users to provide user input for guiding the font generation process. The user input 410 includes a font selection 412 which identifies a base font style to use as a starting point for generating a custom font. A font style is defined by various characteristics, such as shape weight (e.g., thickness relative to height), shape (e.g., rounded, rectilinear, slanted, etc.), type (e.g., serif, sans serif, script, monospace, and display), typeface (e.g., Arial, Helvetica, Calibri, etc.), and/or other design characteristics (e.g., flourishes). In some implementations, the user input 410 includes text or characters 413 (labeled "your text" in FIG. 4) that a user wants to have rendered in a custom font. In other implementations or in the absence of user provided text to render, the system may be configured to generate custom font images for all characters of a selected font.

The user input 410 also includes descriptive text 414 that will be used as a text prompt or used as the basis for generating a text prompt 416 to guide the generation of a custom font. The descriptive text 414 includes one or more words, phrases, sentences, and the like that identify visual attributes and/or characteristics that describe how a user would like a custom font to look. The descriptive text 414 can include substantially any information capable of conveying visual information, such as colors, patterns, text effects (e.g., brushstrokes, swirls, dots, etc.), artistic styles (e.g., watercolor, oil, charcoal, sketch Avant-garde, Digital art Behance, etc.), and artist style (e.g., Vincent Van Gogh, Thomas Kinkade, Claude Monet, etc.). In some implementations, the descriptive text may also include negative descriptive text which indicates one or visual attributes and/or characteristics that a user does not want to see in a custom font. The user input component 402 includes a user interface (UI) having UI controls (e.g., text entry fields, list boxes, dropdown lists, checkboxes, buttons, etc.) that enable a user to enter/select a base font style 412 and to enter descriptive text 414 for the system using a user input device, such as a keyboard, mouse, touch screen, stylus, microphone, etc.

Figures 5A, 5B:
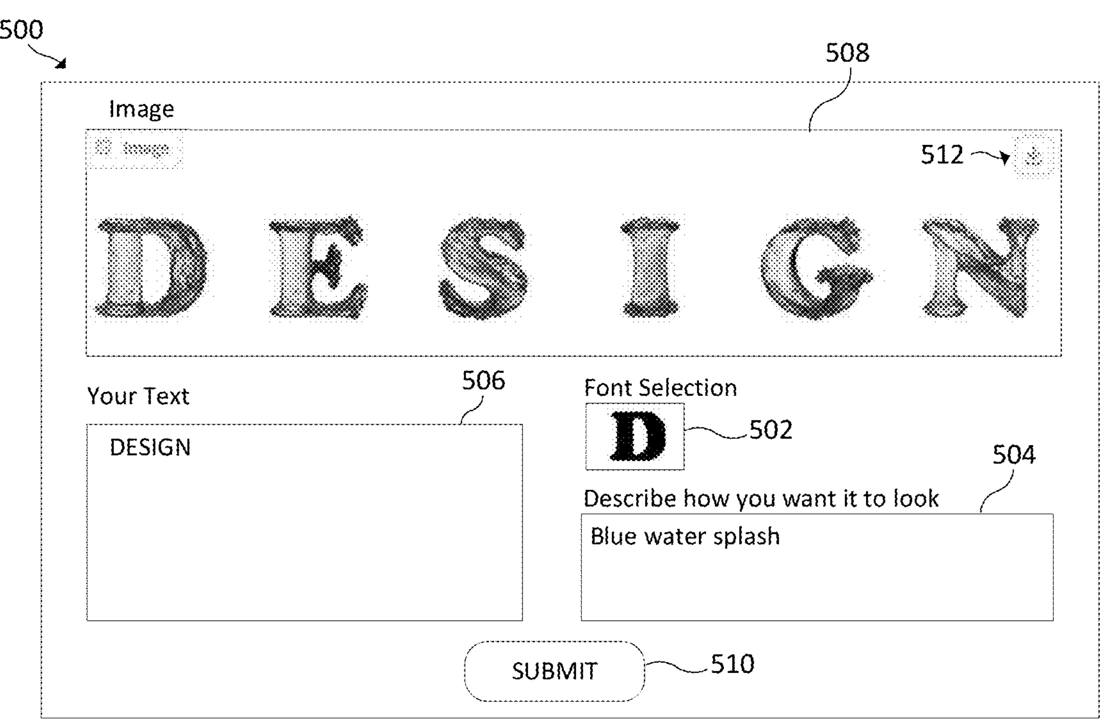
FIGS. 5A-5D show an example user interface for the font generation system during different font generation sessions.
Figure 5C:
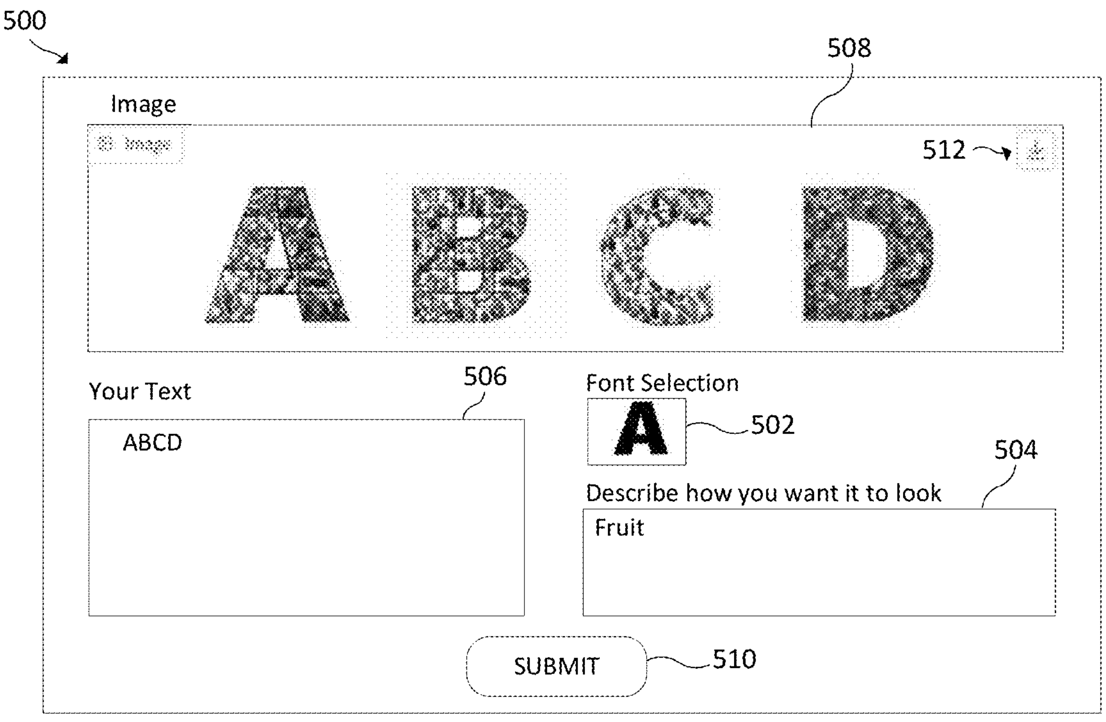
Figure 5D:
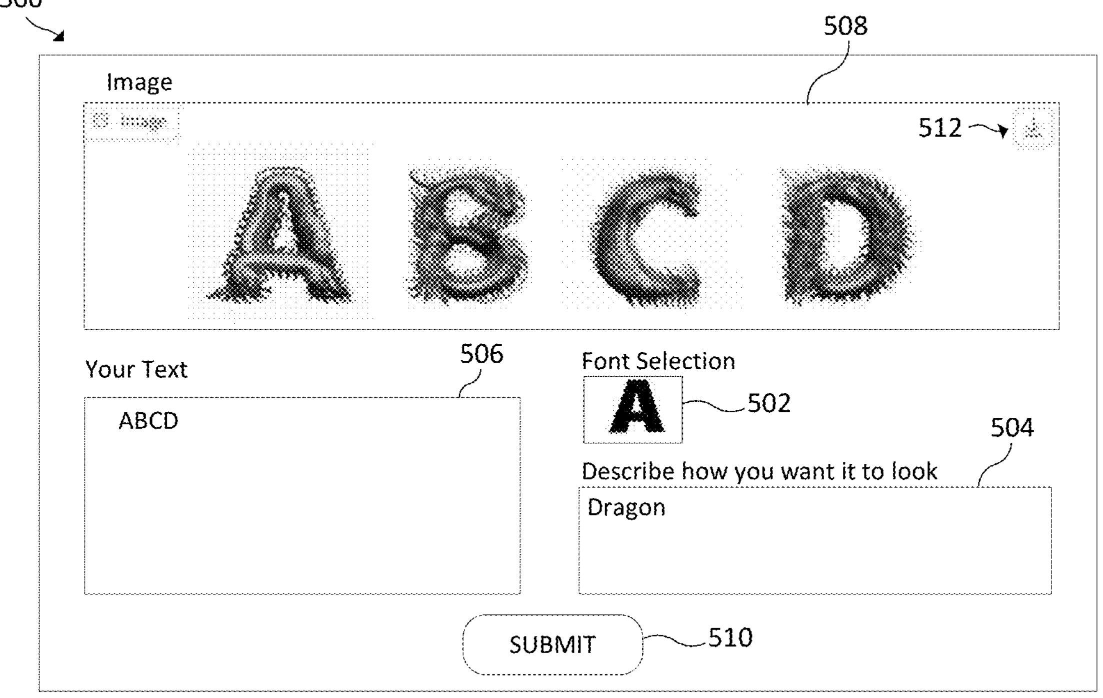

Example implementations of a user interface 500 for a font generation system is shown in FIGS. 5A-5D. Referring to FIG. 5D, the user interface 500 includes a plurality of UI controls that enable a user to interact with the font generation system, such as a font selection control 502, a text prompt entry control 504, a user text entry control 506, a custom font display control 508, an activation control 510, and a download control 512. The font selection control 502 enables a user to select and/or submit a font the base font style for a font generation session. The text prompt entry control 504 is a UI control, such as text entry field, that enables a user to input descriptive text for a text prompt. The user text entry control 506 includes a text entry field that enables a user to enter one or more characters or words which are to be rendered in a custom font. The custom font display control 508 is a UI control for displaying the user provided text in the custom generated by the system. The activation control 510 is a UI control for triggering the generation of a custom art font based on the user input provided in the user interface 500. The download control 512 is a UI control that enables a user to download the custom font image that is displayed by the display control 508. Alternatively, or in addition to, downloading the custom font image, the user interface may enable one or more custom font files, such as bitmaps, SVG files, or Web-safe font files, for the custom font to be downloaded.

Figure 7A:
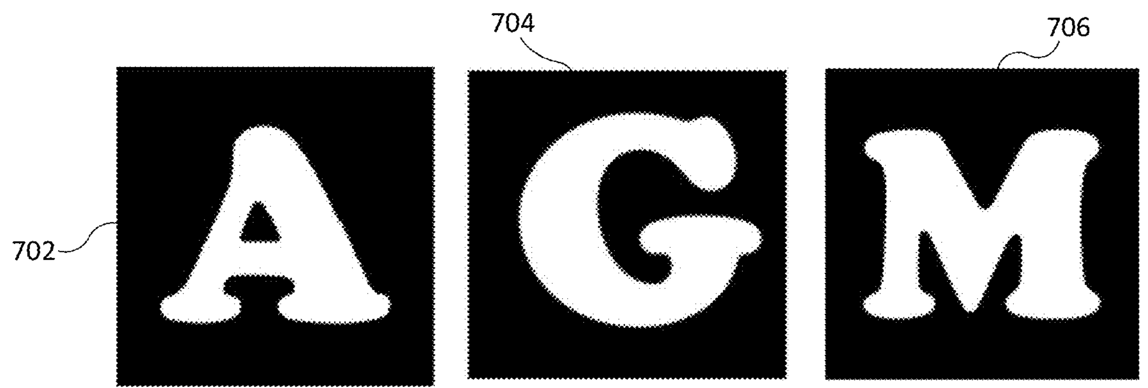
FIG. 7A shows depth maps for different characters which may be included in a custom font.

The depth map component 404 selects/generates depth maps 418 for each alphanumeric character to be included in the custom font. A depth map is a grayscale image of an alphanumeric character in the base font style that encodes depth information for pixels of the image as different shades of gray. Example depth maps 702, 704, 706 for different characters are shown in FIG. 7A. In the example of FIG. 7A, white is used to represent pixels closest to the viewpoint and black is used to represent pixels farthest from the viewpoint. The depth maps correspond substantially to black and white images as there is little to no variation in depth across the image. Thus, a depth map is essentially a white image of an alphanumeric character against a black background. Depth maps provide an easily detectable boundary for guiding image generation inside and at the boundary of a character.

In some implementation, font depth maps for alphanumeric characters of various font styles are pre-generated and stored in a suitable memory that is accessible by the system. In this case, the depth map component 404 receives the selected base font style 412 and the text 413 to be rendered in the custom font and retrieves font depth maps 418 for the characters in the text 413 in the base font style. Alternatively, or in addition to the use of pre-generated font depth maps, the depth map component 404 may be configured to generate font depth maps 418 as needed. Depth map generators for generating depth maps are known in the art. The depth map component 404 may implement any suitable depth map generator (e.g., MiDaS, Affinity, etc.) to generate depth maps for the system.

The font generating model 406 comprises a text-guided depth-to-image model that takes a text prompt 416 and depth maps 422 as inputs and generates custom font images 424 conditioned on the text prompt and depth maps. The depth-guided text-to-image model 406 is a diffusion-based generative model which combines a language model, which transforms the text prompt into a latent representation, and a generative image model, which produces an image conditioned on that representation. In various implementations, the depth-guided text-to-image model 406 is a latent diffusion model. Latent diffusion models operate by repeatedly reducing noise in a latent representation space (which is a lower-dimensional (i.e., compressed) space) and then converting that representation into a complete image. Since latent diffusion operates on a low dimensional space, it greatly reduces the memory and compute requirements compared to pixel-space diffusion models.

Figure 6:
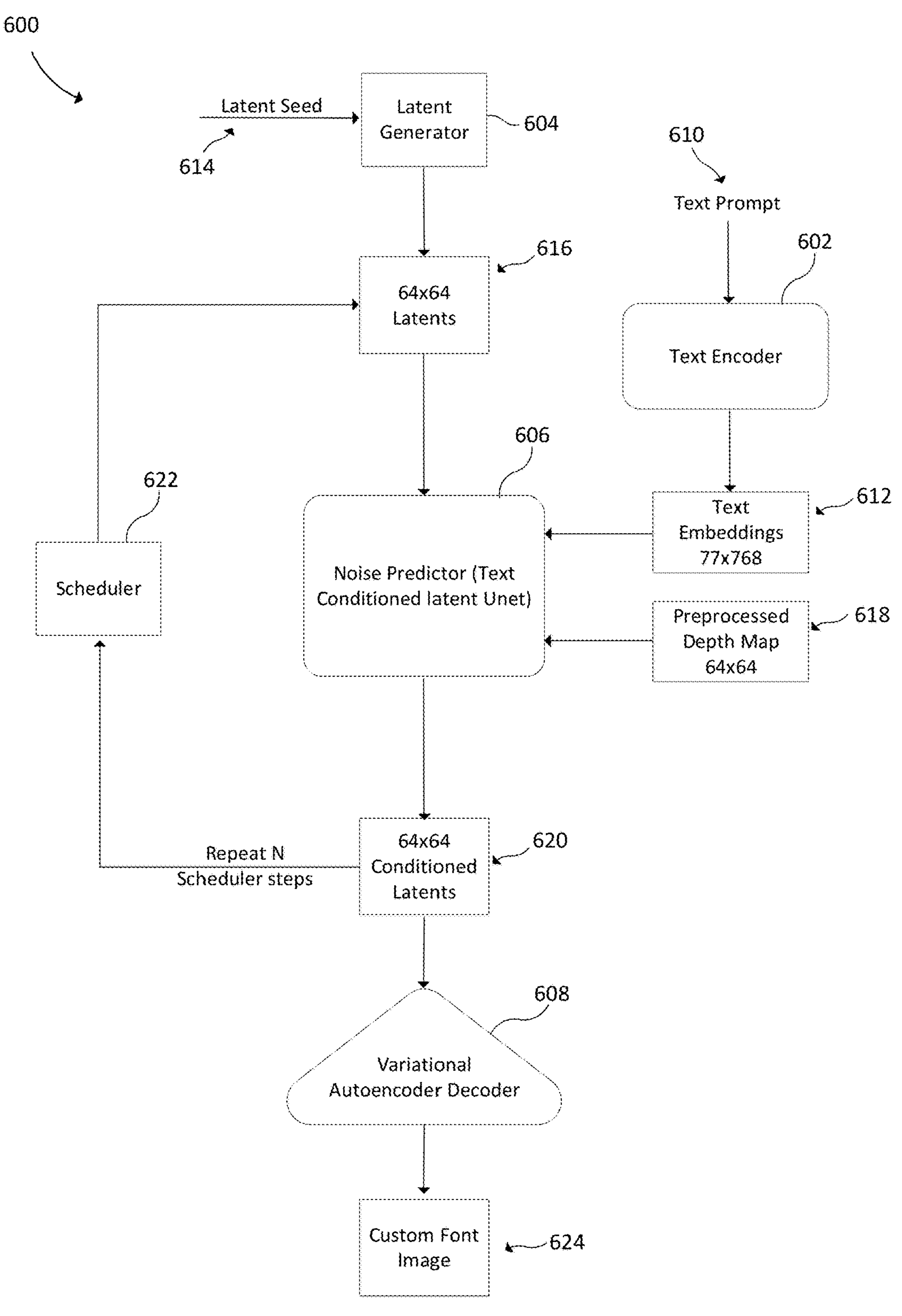
FIG. 6 is a schematic diagram showing the flow for generating custom font images using a generative model, such as a latent diffusion model.

An example implementation of a depth-guided text-to-image model 600 is shown in FIG. 6. The depth-guided text-to-image model 600 is implemented as a latent diffusion model. In specific implementations, the latent diffusion model is a Stable Diffusion model which is a specific type of latent diffusion model. The latent diffusion model 600 of FIG. 6 is made up of several components and models including a text encoder 602, a latent generator 604, a noise predictor 606, and an image decoder 608.

The text encoder 602 takes the text prompt 610 as input and outputs text embeddings 612 which map the text from the text prompt 610 to an embedding space. To this end, the text encoder includes a tokenizer that breaks up the text prompt 610 into a sequence of tokens and converts each token to a number, e.g., by using a lookup table. The text encoder 602 includes a token encoder which converts each token into a numerical representation which maps the token to an embedding space which can be understood by the latent diffusion model. The output of the text encoder 602 is a sequence of latent text embeddings which represents the text prompt 610. In some implementations, the token encoder 602 includes a pre-trained Transformer language model that has been trained to generate token embeddings in a predetermined embedding space from the input text. In some implementations, the text encoder 602 is a CLIP text encoder which is a text encoder frequently used in Stable Diffusion architectures although any suitable text encoder may be utilized.

A latent diffusion process for generating a custom font image for a given character in the base font style begins with an initial latent image 616, also referred to as a "latent." A latent is a pure noise image generated from a latent seed in the latent space. A latent seed 614 is simply a value or parameter used to initialize the generation of an initial latent image for the system. Latent seeds can be selected/generated in any suitable manner. For example, a latent seed can be generated randomly, e.g., by a random number generator and/or can be user-specifiable parameter which can set based on user input received via the UI of the system.

The noise predictor component 606 includes a machine learning model trained to predict how much noise (e.g., Gaussian noise) has been added to an image, in this case a latent image (e.g., image in the latent space). In various implementations, the noise predictor is a U-Net model. A U-Net model is a type of convolutional neural network (CNN) architecture that is commonly used for tasks related to image segmentation. The name "U-Net" comes from its U-shaped architecture, where the network has a contracting path (encoder) and an expansive path (decoder), resembling the shape of a U. The U-Net model receives an input latent image 616, the text embeddings 612 generated from the text prompt 610 and a depth map 618 for a character to render in a custom font as inputs and predicts the amount of noise that has been added to the input latent image 616 conditioned (e.g., guided) by the text prompt and the depth map. The noise predictor 606 is trained to predict the noise in a latent image that, when subtracted, will result in the latent image having the visual attributes and/or characteristics specified by the text prompt. The depth map 618 serves as a mask which defines the character boundary which helps differentiate the font shape from the image background to further guide the denoising process.

The latent diffusion model performs a predetermined number N of denoising steps using the initial latent image 616 as a starting point. For the first denoising step, the noise predictor component 606 predicts an amount of residual noise in the initial latent 616 which is conditioned by the text prompt 610 and the depth map 618 and generates a new latent image 620 by subtracting the predicted noise from the initial latent image 616. The new latent image 620 is then provided to a scheduler component 602 which processes the latent image 620 using a scheduler algorithm which adds a predetermined amount of noise (e.g., Gaussian) to the latent image to generate the input latent image 616 used for the next denoising step. This process is repeated until the predetermined number N of sampling steps have been performed. The output latent image 620 of the last denoising step is the provided to the image decoder 608.

The image decoder 608 is a machine learning model that has been trained to convert an input latent image (e.g., conditioned latent 620) in the latent space to a custom font output image 624 in the pixel space. In some implementations, the image decoder 608 is implemented by a Variational Auto Encoder (VAE) although any suitable type of image encoder may be utilized. The image decoder 608 outputs a custom output image 624 that corresponds to an image in the pixel space (e.g., 512×512 or the like) of a character in the base font style with visual characteristics and text effects derived from the text prompt. The process is repeated for each character that is to be rendered in the custom font so that a custom font output image 624 is generated for each desired character in the custom font.

Returning to FIG. 4, the font generation system 400 includes a postprocessing component 428 for performing one or more image postprocessing operations on the output images 426 of the character in the custom font. As an example, the postprocessing operations include background removal for removing the background from the output images of the custom font and/or increasing the resolution of the custom font images. Postprocessing operations, including background image removal and upscaling, can be performed in any suitable manner.

As noted above, one difficulty associated with generating custom font images using generative models is generating custom font images with style-consistency across letters. Previously known font generation systems have attempted to address this issue by generating a custom font image, processing the image to identify and extract a style for the font, and then injecting the style to other characters for the custom font. However, this method of improving the consistency of custom fonts across characters requires significant computation resources for extra font generation, style extraction, and injection. In addition, the style is locked to the first generated font and requires the use of hyperparameters to control and fine-tune the extent to which the style is ingested during image generation.

Figure 7B:
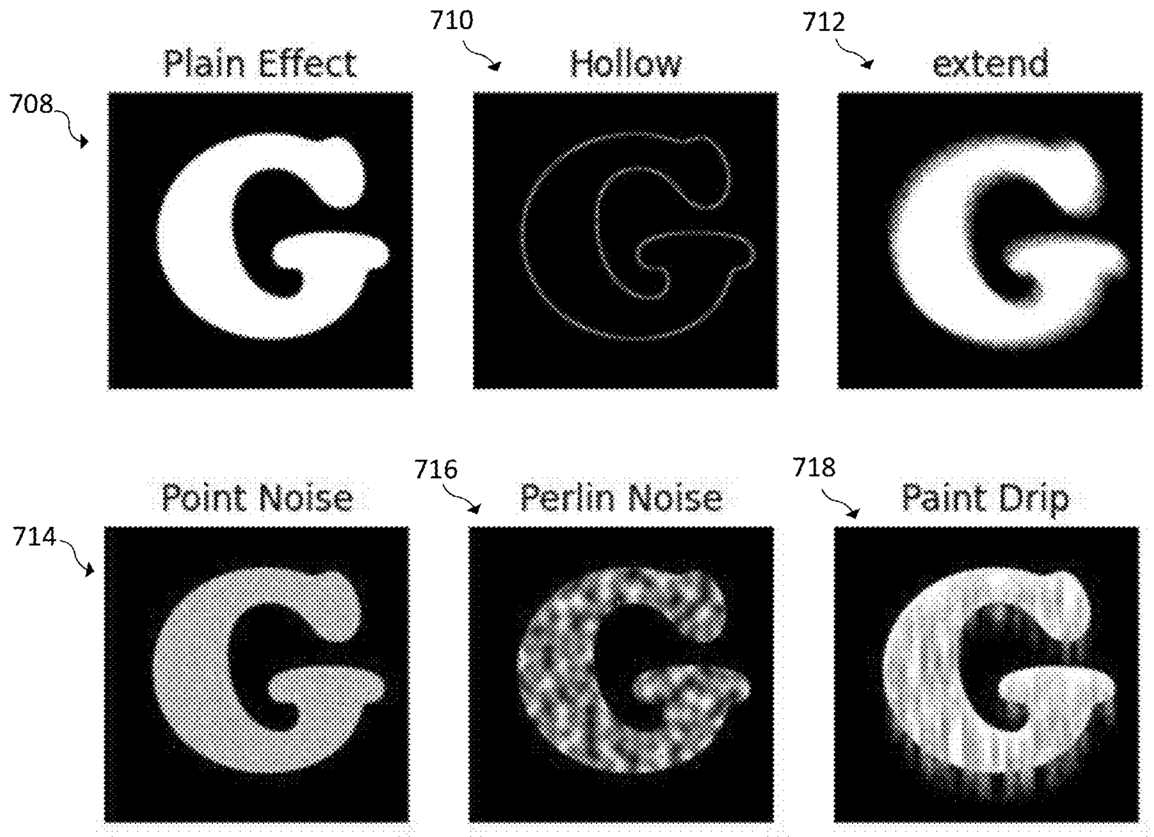
FIG. 7B shows depth maps with different preprocessing effects.

To address these issues, the font generation system 400 includes a preprocessing component 420 that is used to preprocess the depth maps 418 which are provided to the noise predictor 606 by adding noise to the depth maps. The noise may be added by processing each depth map using one or more filters or functions that result in a substantially uniform level of noise to be added across the depth map, at least within the character boundary. Examples of types of noise effects for depth maps include Gaussian noise, Perlin noise, point noise, and the like. Various preprocessing effects may also be used to add noise to a depth map. As examples, paint drip effects, brushstroke effects, various pattern effects, font expand/extend, and the like can be used to add patterns and artifacts to a depth map which equate to noise. FIG. 7B shows depth maps for the letter "G" in a particular base style. The depth map 708 is a plain image of the letter "G" with no added noise. Depth map 710 has been preprocessed by removing the part of the image within the boundary of the letter "G" resulting in a hollow effect. Depth map 712 has been preprocessed by extending the image of the letter "G" which results in a fuzzy appearance along the boundary of the letter. Depth map 714 has been preprocessed by adding point noise to the depth map. Depth map 716 has been preprocessed by adding Perlin noise to the depth map. Depth map 718 has been preprocessed by adding a paint drip effect to the depth map. The noise added to the depth maps forms artifacts in the depth maps which provide starting points for feature size and image generation during the denoising steps. Because each depth map used in a custom font generation session will have the same preprocessing operation/effect applied thereto, generating custom font images for different characters from the same text prompt would have the same artifacts and feature size to help guide the denoising steps so that denoising is more consistent across characters which in turn should result in more consistency in the visual characteristics of the final output images.

In some implementations, the system may be configured to select a preprocessing effect to use based on the type of visual effects, attributes, and/or characteristics that are to be used in generating a custom font. For example, some texture effects and images that are used as a source for filling in a character may have small feature sizes. In this case, it may be advantageous to preprocess a depth map with a preprocessing effect, such as point noise, Perlin noise, and the like, that generates small noise artifacts which can set the size of visual elements for some fonts. Similarly, some objects that are to be used as the basis for rendering fonts may have a visual characteristic that could affect the border of a font, such as hair, fur, scales, vines, ears, horns, and the like. In this case, a preprocessing effect that adds a predetermined amount of noise, e.g., fuzziness, blurriness, and the like, at the border of a depth map enables such effects to be rendered more consistently across characters of a custom font. One or more preprocessing steps with different preprocessing effects may be used to impart characteristics to a depth map that facilitates the generation of desired characteristics. In various implementations, the preprocessing component may include a machine learning model, such as a language model or LLM, can be used to process the text of a prompt and to identify one or more preprocessing effects to use for the depth maps for a custom font.

Once postprocessing of custom font character images has been completed, the custom font character images are provided to the custom font output component 408 which manages the output of the custom font for the system. In some implementations, the custom font output component 408 is configured to provide the final custom font images 426 to a user interface for the font generation system where they can be displayed. FIGS. 5A-5D show the user interface 500 during different font generating sessions. Different text prompts are utilized in each example and examples custom font images which may be generated by the system based on the text prompt are shown in the respective examples. In FIG. 5A, the descriptive text for the text prompt (in text entry field 504) is "blue water splash." The user also provided a font selection in font selection control 502. The user text to be rendered in the custom font is "DESIGN" which has been rendered in the display area in a blue color with texture effects resembling turbulent water. In FIG. 5B, the descriptive text for the text prompt (in text entry field 504) is "shiny gold balloon." The user also provided a font selection in font selection control 502. The user text to be rendered in the custom font is "DESIGN" which has been rendered in the display area with shapes resembling balloon shapes and with a shiny gold texture effect. In FIG. 5C, the descriptive text for the text prompt (in text entry field 504) is "fruit." The user text to be rendered in the custom font in this example is "ABCD" which has been rendered in the display area with small images of different types of fruit. In FIG. 5D, the descriptive text for the text prompt (in text entry field 504) is "dragon." The user text to be rendered in the custom font in this example is "ABCD" which has been rendered in the display area with images resembling dragons forming the shapes of the letters and including scales or fur along the edges of each of the letters.

As noted above, the images of the user provided text rendered in the custom font may be downloaded by a user and used as needed. In some implementations, the system may be configured to use the custom font images created by the system to generate a font file or files in a suitable format which can be used to integrate the custom font into one or more applications, such as client application 316. Any suitable file type and/or file format may be used for the custom font output. As examples, the custom font output may include one or more bitmaps, SVG files, or Web-safe font files that utilize the "@font-face" rule of the CSS3 specification.

Prompt engineering may be used to further improve font consistency and overall font generation performance for the system. Prompt engineering, in the context of natural language processing and machine learning, refers to the process of designing and formulating prompts that are used to interact with or instruct models. The goal of prompt engineering is to craft input text that guides the model to generate desired outputs or responses. In the context of the instant disclosure, prompt engineering includes generating font descriptions and instructions with consistent phrasing, formatting, and the like that increases the likelihood of achieving a desired visual style for a custom font and style consistency across characters using a given generative model (e.g., latent diffusion model, Stable Diffusion model, etc.). In embodiments, prompt engineering is implemented by a prompt engineering component which includes a language model which has been trained to generate text prompts for the font generation system from descriptive words, phrases, and instructions provided by a user. The text prompt can be generated by using the model to edit the descriptive text, e.g., by replacing, adding, deleting, rewording, rearranging, etc. the language of the prompt so that more precise descriptions/instructions are achieved. Prompt engineering takes into consideration model capabilities, inputs, and desired outputs for a given model to further increase the likelihood of achieving desired results. In the example implementation of FIG. 4, a prompt engineering component 430 may be provided which takes the descriptive text 414 as input and generates a text prompt that takes into consideration the type of font generating model, the types of inputs to the model, the desired output of the model to generate the text prompt.

Figure 8:
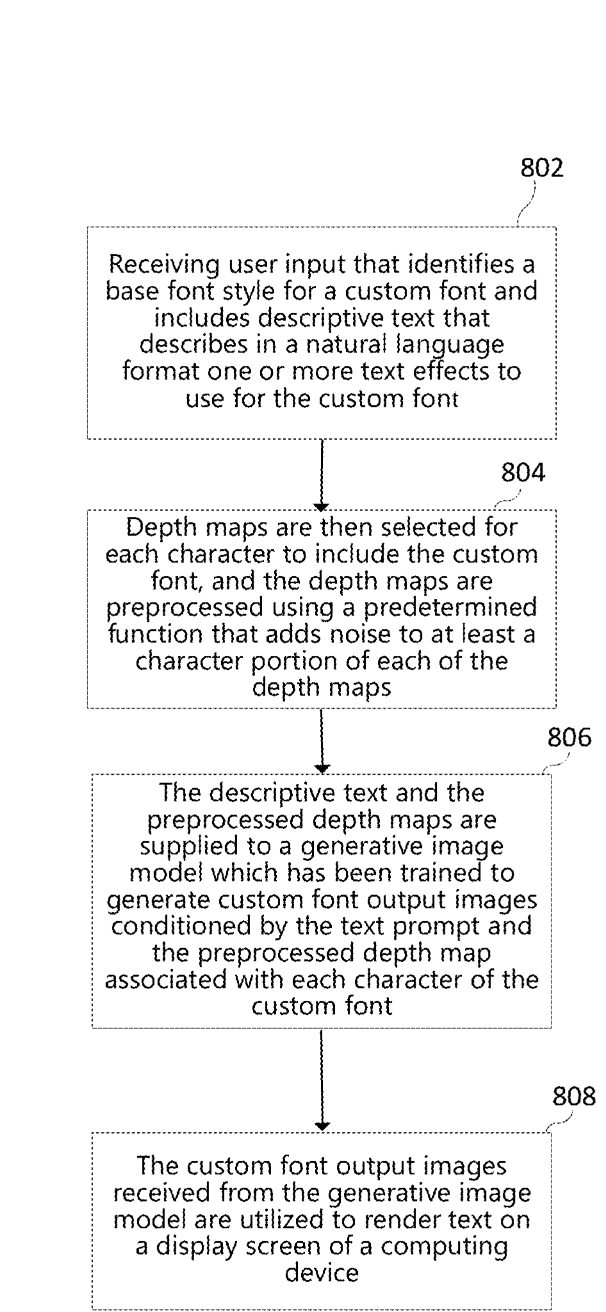
FIG. 8 is a flowchart of an example method for generating custom art fonts using a generative image model.

FIG. 8 is a flowchart of an example method 800 for generating fonts with improved style consistency using generative image models. The method begins with receiving user input that identifies a base font style for a custom font and includes descriptive text that describes in a natural language format one or more text effects to use for the custom font (block 802). Depth maps are then selected for each character to include the custom font, and the depth maps are preprocessed using a predetermined function that adds noise to at least a character portion of each of the depth maps (block 804). The descriptive text and the preprocessed depth maps are supplied to a generative image model which has been trained to generate custom font output images conditioned by the text prompt and the preprocessed depth map associated with each character of the custom font (block 806). The custom font output images are received from the generative image model and utilized to render text on a display screen of a computing device (block 808).

Figure 9:
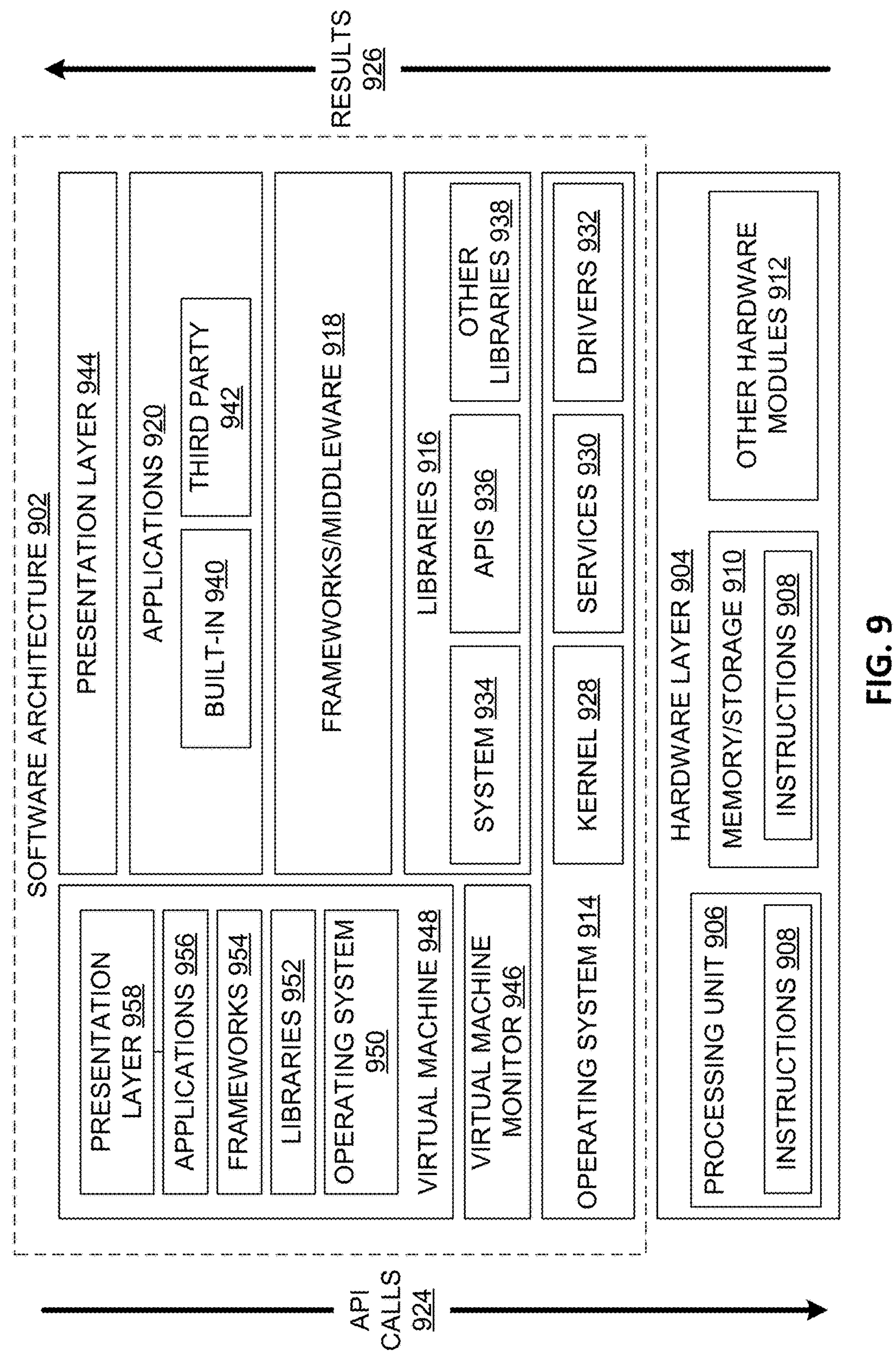
FIG. 9 is a block diagram illustrating an example software architecture, various portions of which may be used in conjunction with various hardware architectures herein described.

FIG. 9 is a block diagram 900 illustrating an example software architecture 902, various portions of which may be used in conjunction with various hardware architectures herein described, which may implement any of the above-described features. FIG. 9 is a non-limiting example of a software architecture and it will be appreciated that many other architectures may be implemented to facilitate the functionality described herein. The software architecture 902 may execute on hardware such as a machine 1000 of FIG. 10 that includes, among other things, processors 1010, memory 1030, and input/output (I/O) components 1050. A representative hardware layer 904 is illustrated and can represent, for example, the machine 1000 of FIG. 10. The representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 906 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs for applications 920 and/or other software modules.

The applications 920 include built-in applications 940 and/or third-party applications 942. Examples of built-in applications 940 may include, but are not limited to, a contacts application, a browser application, a location application, a media application, a messaging application, and/or a game application. Third-party applications 942 may include any applications developed by an entity other than the vendor of the particular platform. The applications 920 may use functions available via OS 914, libraries 916, frameworks 918, and presentation layer 944 to create user interfaces to interact with users.

Some software architectures use virtual machines, as illustrated by a virtual machine 948. The virtual machine 948 provides an execution environment where applications/modules can execute as if they were executing on a hardware machine (such as the machine 1000 of FIG. 10, for example). The virtual machine 948 may be hosted by a host OS (for example, OS 914) or hypervisor, and may have a virtual machine monitor 946 which manages operation of the virtual machine 948 and interoperation with the host operating system. A software architecture, which may be different from software architecture 902 outside of the virtual machine, executes within the virtual machine 948 such as an operating system 950, libraries 952, frameworks 954, applications 956, and/or a presentation layer 958.

Figure 10:
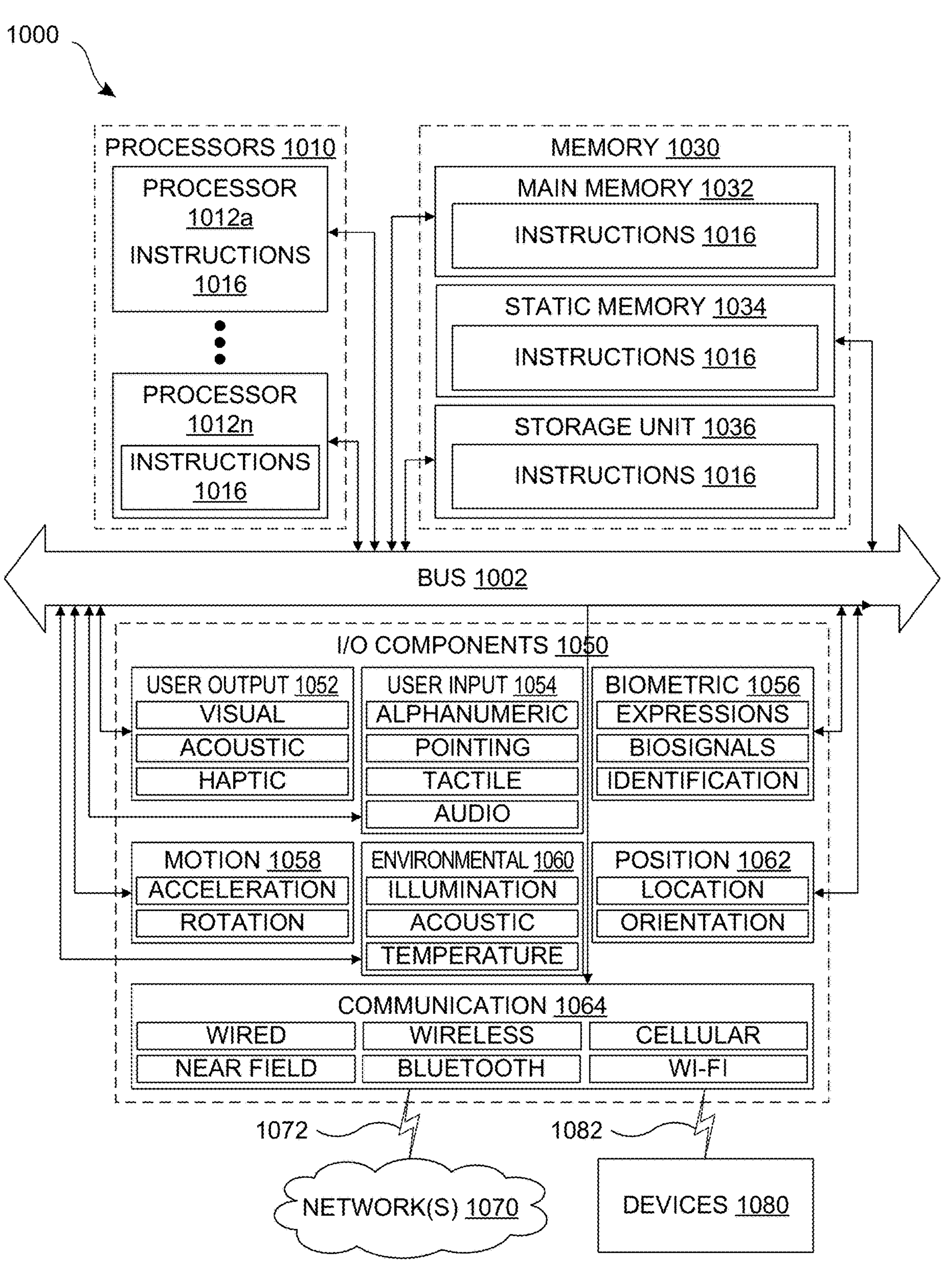
FIG. 10 is a block diagram illustrating components of an example machine configured to read instructions from a machine-readable medium and perform any of the features described herein.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" includes a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012*a* to 1012*n* that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056, motion components 1058, environmental components 1060, and/or position components 1062, among a wide array of other physical sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-fingerprint-, and/or facial-based identification). The motion components 1058 may include, for example, acceleration sensors (for example, an accelerometer) and rotation sensors (for example, a gyroscope). The environmental components 1060 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network (s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1064, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A font generation system comprising:

a processor; and a memory in communication with the processor, the memory comprising executable instructions that, when executed by the processor alone or in combination with other processors, cause the font generation system to perform functions of:

receiving user input that identifies a base font style for a custom font and includes descriptive text that describes in a natural language format one or more text effects to use for the custom font;

selecting depth maps for characters to be included in the custom font, each depth map including an image of one of the characters for the custom font;

preprocessing the depth maps for the custom font using a predetermined function that adds noise to at least a character portion of each of the depth maps; and providing the descriptive text and the preprocessed depth maps to a generative image model, the descriptive text being provided to the generative image model as a text prompt, the generative image model being trained to generate a custom font output image for each character to be included in the custom font conditioned by the text prompt and the preprocessed depth map associated with the character; and receiving the custom font output images for each character included in the custom font from the generative image model and utilizing the custom font output images to render text on a display screen of a computing device.

Item 2. The font generation system of item 1, wherein the predetermined function for adding noise to the depth maps includes at least one of a Gaussian noise function, a point noise function, a Perlin noise function, and a texture effect function.

Item 3. The font generation system of any of items 1-2, wherein the generative image model is a latent diffusion model having a text encoder which generates text embeddings from the descriptive text, a noise predictor which is trained to perform a denoising process for each of the characters included in the custom font to generate a latent output image based on the text embeddings and the preprocessed depth maps associated with each of the characters of the custom font, and a text decoder which converts a latent output image in a latent space for each of the characters to a custom font image in a pixel space for each of the characters of the custom font.

Item 4. The font generation system of any of items 1-3, wherein the denoising process for a character in the custom font includes performing a predetermined number of denoising steps on an input latent image to generate a conditioned latent image based on the text embeddings and the preprocessed depth map for the character, and wherein, for each of the denoising steps, the noise predictor predicts an amount of noise in the input latent image that should be subtracted to arrive at a desired custom font image for the character, the amount of noise being subtracted from the input latent image to generate a conditioned latent image, the conditioned latent image of a last denoising step corresponding to the latent output image.

Item 5. The font generation system of any of items 1-4, further comprising:

using a prompt engineering component to generate the text prompt from the descriptive text using a prompt engineering scheme for automatically generating the text prompt which takes into consideration at least one of a type of generative model used and a desired output of the generative image model and automatically generates the text prompt from the descriptive text by adding text, deleting text, replacing text, and/or formatting text.

Item 6. The font generation system of any of items 1-5, wherein the depth map includes a character portion and a background image portion, the character portion being depicted in a first grayscale shade and the background portion being depicted in a second grayscale shade.

Item 7. The font generation system of any of items 1-6, wherein the user input is received via a user interface of the font generation system, the user interface including user interface controls for receiving a font style selection designating the base font style, for receiving the descriptive text and for displaying the custom font output images.

Item 8. The font generation system of any of items 1-7, further comprising:

performing a postprocessing operation to remove a background from the custom font images.

Item 9. A method for generating custom art fonts using a generative image model, the method comprising:

receiving user input that identifies a base font style for a custom font and includes descriptive text that describes in a natural language format one or more text effects to use for the custom font;

selecting depth maps for characters to be included in the custom font, each depth map including an image of one of the characters for the custom font;

preprocessing the depth maps for the custom font using a predetermined function that adds noise to at least a character portion of each of the depth maps; and providing the descriptive text and the preprocessed depth maps to the generative image model, the descriptive text being provided to the generative image model as a text prompt, the generative image model being trained to generate a custom font output image for each character to be included in the custom font conditioned by the text prompt and the preprocessed depth map associated with the character; and receiving the custom font output images for each character included in the custom font from the generative image model and utilizing the custom font output images to render text on a display screen of a computing device.

Item 10. The method of item 9, wherein the predetermined function for adding noise to the depth maps includes at least one of a Gaussian noise function, a point noise function, a Perlin noise function, and a texture effect function.

Item 11. The method of any of items 9-10, wherein the generative image model is a latent diffusion model having a text encoder which generates text embeddings from the descriptive text, a noise predictor which is trained to perform a denoising process for each of the characters included in the custom font to generate a latent output image based on the text embeddings and the preprocessed depth maps associated with each of the characters of the custom font, and a text decoder which converts a latent output image in a latent space for each of the characters to a custom font image in a pixel space for each of the characters of the custom font.

Item 12. The method of any of items 9-11, wherein the denoising process for a character in the custom font includes performing a predetermined number of denoising steps on an input latent image to generate a conditioned latent image based on the text embeddings and the preprocessed depth map for the character, and wherein, for each of the denoising steps, the noise predictor predicts an amount of noise in the input latent image that should be subtracted to arrive at a desired custom font image for the character, the amount of noise being subtracted from the input latent image to generate a conditioned latent image, the conditioned latent image of a last denoising step corresponding to the latent output image.

Item 13. The method of any of items 9-12, further comprising:

using a prompt engineering component to generate the text prompt from the descriptive text using a prompt engineering scheme for automatically generating the text prompt which takes into consideration at least one of a type of generative model used and a desired output of the generative image model and automatically generates the text prompt from the descriptive text by adding text, deleting text, replacing text, and/or formatting text.

Item 14. The method of any of items 9-13, wherein the depth map includes a character portion and a background image portion, the character portion being depicted in a first grayscale shade and the background portion being depicted in a second grayscale shade.

Item 15. The method of any of items 9-14, wherein the user input is received via a user interface of the font generation system, the user interface including user interface controls for receiving a font style selection designating the base font style, for receiving the descriptive text and for displaying the custom font output images.

Item 16. The method of any of items 9-15, further comprising:

performing a postprocessing operation to remove a background from the custom font images.

Item 17. A non-transitory computer readable medium on which are stored instructions that, when executed, cause a programmable device to perform functions of:

receiving user input that identifies a base font style for a custom font and includes descriptive text that describes in a natural language format one or more text effects to use for the custom font;

selecting depth maps for characters to be included in the custom font, each depth map including an image of one of the characters for the custom font;

preprocessing the depth maps for the custom font using a predetermined function that adds noise to at least a character portion of each of the depth maps; and providing the descriptive text and the preprocessed depth maps to a generative image model, the descriptive text being provided to the generative image model as a text prompt, the generative image model being trained to generate a custom font output image for each character to be included in the custom font conditioned by the text prompt and the preprocessed depth map associated with the character; and receiving the custom font output images for each character included in the custom font from the generative image model and utilizing the custom font output images to render text on a display screen of a computing device.

Item 18. The computer readable medium of item 17, wherein the predetermined function for adding noise to the depth maps includes at least one of a Gaussian noise function, a point noise function, a Perlin noise function, and a texture effect function.

Item 19. The computer readable medium of any of items 17-18, wherein the generative image model is a latent diffusion model having a text encoder which generates text embeddings from the descriptive text, a noise predictor which is trained to perform a denoising process for each of the characters included in the custom font to generate a latent output image based on the text embeddings and the preprocessed depth maps associated with each of the characters of the custom font, and a text decoder which converts a latent output image in a latent space for each of the characters to a custom font image in a pixel space for each of the characters of the custom font.

Item 20. The computer readable medium of any of items 17-19, wherein the denoising process for a character in the custom font includes performing a predetermined number of denoising steps on an input latent image to generate a conditioned latent image based on the text embeddings and the preprocessed depth map for the character, and wherein, for each of the denoising steps, the noise predictor predicts an amount of noise in the input latent image that should be subtracted to arrive at a desired custom font image for the character, the amount of noise being subtracted from the input latent image to generate a conditioned latent image, the conditioned latent image of a last denoising step corresponding to the latent output image.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A font generation system comprising:

a processor; and a memory in communication with the processor, the memory comprising executable instructions that, when executed by the processor alone or in combination with other processors, cause the font generation system to perform functions of:

receiving user input that identifies a base font style for a custom font and includes descriptive text that describes in a natural language format one or more text effects to use for the custom font;

selecting depth maps for characters to be included in the custom font, each depth map including an image of one of the characters for the custom font;

preprocessing the depth maps for the custom font using a predetermined function that adds noise to at least a character portion of each of the depth maps; and providing the descriptive text and the preprocessed depth maps to a generative image model, the descriptive text being provided to the generative image model as a text prompt, the generative image model being trained to generate a custom font output image for each character to be included in the custom font conditioned by the text prompt and the preprocessed depth map associated with the character; and receiving the custom font output images for each character included in the custom font from the generative image model and utilizing the custom font output images to render text on a display screen of a computing device.

2. The font generation system of claim 1, wherein the predetermined function for adding noise to the depth maps includes at least one of a Gaussian noise function, a point noise function, a Perlin noise function, and a texture effect function.

3. The font generation system of claim 2, wherein the generative image model is a latent diffusion model having a text encoder which generates text embeddings from the descriptive text, a noise predictor which is trained to perform a denoising process for each of the characters included in the custom font to generate a latent output image based on the text embeddings and the preprocessed depth maps associated with each of the characters of the custom font, and a text decoder which converts a latent output image in a latent space for each of the characters to a custom font image in a pixel space for each of the characters of the custom font.

4. The font generation system of claim 3, wherein the denoising process for a character in the custom font includes performing a predetermined number of denoising steps on an input latent image to generate a conditioned latent image based on the text embeddings and the preprocessed depth map for the character, and wherein, for each of the denoising steps, the noise predictor predicts an amount of noise in the input latent image that should be subtracted to arrive at a desired custom font image for the character, the amount of noise being subtracted from the input latent image to generate a conditioned latent image, the conditioned latent image of a last denoising step corresponding to the latent output image.

5. The font generation system of claim 1, further comprising:

using a prompt engineering component to generate the text prompt from the descriptive text using a prompt engineering scheme for automatically generating the text prompt which takes into consideration at least one of a type of generative model used and a desired output of the generative image model and automatically generates the text prompt from the descriptive text by adding text, deleting text, replacing text, and/or formatting text.

6. The font generation system of claim 1, wherein the depth map includes a character portion and a background image portion, the character portion being depicted in a first grayscale shade and the background portion being depicted in a second grayscale shade.

7. The font generation system of claim 1, wherein the user input is received via a user interface of the font generation system, the user interface including user interface controls for receiving a font style selection designating the base font style, for receiving the descriptive text and for displaying the custom font output images.

8. The font generation system of claim 1, further comprising:

performing a postprocessing operation to remove a background from the custom font images.

9. A method for generating custom art fonts using a generative image model, the method comprising:

receiving user input that identifies a base font style for a custom font and includes descriptive text that describes in a natural language format one or more text effects to use for the custom font;

selecting depth maps for characters to be included in the custom font, each depth map including an image of one of the characters for the custom font;

preprocessing the depth maps for the custom font using a predetermined function that adds noise to at least a character portion of each of the depth maps; and providing the descriptive text and the preprocessed depth maps to the generative image model, the descriptive text being provided to the generative image model as a text prompt, the generative image model being trained to generate a custom font output image for each character to be included in the custom font conditioned by the text prompt and the preprocessed depth map associated with the character; and receiving the custom font output images for each character included in the custom font from the generative image model and utilizing the custom font output images to render text on a display screen of a computing device.

10. The method of claim 9, wherein the predetermined function for adding noise to the depth maps includes at least one of a Gaussian noise function, a point noise function, a Perlin noise function, and a texture effect function.

11. The method of claim 10, wherein the generative image model is a latent diffusion model having a text encoder which generates text embeddings from the descriptive text, a noise predictor which is trained to perform a denoising process for each of the characters included in the custom font to generate a latent output image based on the text embeddings and the preprocessed depth maps associated with each of the characters of the custom font, and a text decoder which converts a latent output image in a latent space for each of the characters to a custom font image in a pixel space for each of the characters of the custom font.

12. The method of claim 11, wherein the denoising process for a character in the custom font includes performing a predetermined number of denoising steps on an input latent image to generate a conditioned latent image based on the text embeddings and the preprocessed depth map for the character, and wherein, for each of the denoising steps, the noise predictor predicts an amount of noise in the input latent image that should be subtracted to arrive at a desired custom font image for the character, the amount of noise being subtracted from the input latent image to generate a conditioned latent image, the conditioned latent image of a last denoising step corresponding to the latent output image.

13. The method of claim 9, further comprising:

using a prompt engineering component to generate the text prompt from the descriptive text using a prompt engineering scheme for automatically generating the text prompt which takes into consideration at least one of a type of generative model used and a desired output of the generative image model and automatically generates the text prompt from the descriptive text by adding text, deleting text, replacing text, and/or formatting text.

14. The method of claim 9, wherein the depth map includes a character portion and a background image portion, the character portion being depicted in a first grayscale shade and the background portion being depicted in a second grayscale shade.

15. The method of claim 9, wherein the user input is received via a user interface of a font generation system, the user interface including user interface controls for receiving a font style selection designating the base font style, for receiving the descriptive text and for displaying the custom font output images.

16. The method of claim 9, further comprising:

performing a postprocessing operation to remove a background from the custom font images.

17. A non-transitory computer readable medium on which are stored instructions that, when executed, cause a programmable device to perform functions of:

receiving user input that identifies a base font style for a custom font and includes descriptive text that describes in a natural language format one or more text effects to use for the custom font;

selecting depth maps for characters to be included in the custom font, each depth map including an image of one of the characters for the custom font;

preprocessing the depth maps for the custom font using a predetermined function that adds noise to at least a character portion of each of the depth maps; and providing the descriptive text and the preprocessed depth maps to a generative image model, the descriptive text being provided to the generative image model as a text prompt, the generative image model being trained to generate a custom font output image for each character to be included in the custom font conditioned by the text prompt and the preprocessed depth map associated with the character; and receiving the custom font output images for each character included in the custom font from the generative image model and utilizing the custom font output images to render text on a display screen of a computing device.

18. The computer readable medium of claim 17, wherein the predetermined function for adding noise to the depth maps includes at least one of a Gaussian noise function, a point noise function, a Perlin noise function, and a texture effect function.

19. The computer readable medium of claim 18, wherein the generative image model is a latent diffusion model having a text encoder which generates text embeddings from the descriptive text, a noise predictor which is trained to perform a denoising process for each of the characters included in the custom font to generate a latent output image based on the text embeddings and the preprocessed depth maps associated with each of the characters of the custom font, and a text decoder which converts a latent output image in a latent space for each of the characters to a custom font image in a pixel space for each of the characters of the custom font.

20. The computer readable medium of claim 19, wherein the denoising process for a character in the custom font includes performing a predetermined number of denoising steps on an input latent image to generate a conditioned latent image based on the text embeddings and the preprocessed depth map for the character, and Wherein, for each of the denoising steps, the noise predictor predicts an amount of noise in the input latent image that should be subtracted to arrive at a desired custom font image for the character, the amount of noise being subtracted from the input latent image to generate a conditioned latent image, the conditioned latent image of a last denoising step corresponding to the latent output image.

* * * * *